(12) United States Patent
Coulmeau

(10) Patent No.: US 8,112,187 B2
(45) Date of Patent: Feb. 7, 2012

(54) FORMATION FLIGHT CONTROL METHOD

(75) Inventor: Francois Coulmeau, Seilh (FR)

(73) Assignee: Thales (FR)

(*) Notice: Subject to any disclaimer, the term of this patent is extended or adjusted under 35 U.S.C. 154(b) by 708 days.

(21) Appl. No.: 12/095,016

(22) PCT Filed: Nov. 21, 2006

(86) PCT No.: PCT/EP2006/068727
§ 371 (c)(1),
(2), (4) Date: Jul. 30, 2008

(87) PCT Pub. No.: WO2007/060167
PCT Pub. Date: May 31, 2007

(65) Prior Publication Data
US 2009/0319101 A1 Dec. 24, 2009

(30) Foreign Application Priority Data
Nov. 25, 2005 (FR) .................................. 05 11963

(51) Int. Cl.
*G06G 5/04* (2006.01)
(52) U.S. Cl. ................................. 701/7; 701/4; 701/213
(58) Field of Classification Search ................ 701/4–14, 701/300, 301, 302, 207–213; 342/29, 36, 342/37, 455; 340/961
See application file for complete search history.

(56) References Cited

U.S. PATENT DOCUMENTS

| | | | |
|---|---|---|---|
| 6,271,768 B1* | 8/2001 | Frazier et al. | 340/961 |
| 6,393,358 B1* | 5/2002 | Erzberger et al. | 701/120 |
| 6,459,411 B2* | 10/2002 | Frazier et al. | 342/455 |
| 6,926,233 B1 | 8/2005 | Corcoran, III | |
| 2002/0183900 A1 | 12/2002 | Sainthuile | |
| 2005/0165516 A1 | 7/2005 | Haissig et al. | |

* cited by examiner

*Primary Examiner* — Richard M. Camby
(74) *Attorney, Agent, or Firm* — Lowe Hauptman Ham & Berner, LLP

(57) ABSTRACT

The invention relates to a method for controlling the formation flight of at least two aircraft (1,2). The first aircraft (1) includes means of transmitting its position, its velocity and its flight plan. The flight plan has predictions of altitude, velocity and time for at least one next waypoint (WPT). The second aircraft (2) includes means of receiving the information transmitted by the first aircraft (1). According to the invention, the second aircraft (2) determines its future flight plan as a function of the information received from the first aircraft (1) in order to maintain a constant separation (T) from the first aircraft (1).

8 Claims, 1 Drawing Sheet

FORMATION FLIGHT CONTROL METHOD

CROSS-REFERENCE TO RELATED APPLICATIONS

The present Application is based on International Application No. PCT/EP2006/068727, filed on Nov. 21, 2006, which in turn corresponds to French Application No. 0511963, filed on Nov. 25, 2005, and priority is hereby claimed under 35 USC §119 based on these applications. Each of these applications are hereby incorporated by reference in their entirety into the present application.

FIELD OF THE INVENTION

The invention relates to a formation flight control method. Generally speaking, formation flight is used to control air traffic, notably in the approach phase. More precisely, a controller may request several aircraft to follow each other at a specified interval. This procedure is today used for two or even three aircraft. The controller therefore only has to control two or three aircraft. The controller delegates to the aircraft the control of their separation. The separation interval may be expressed in time or in distance.

BACKGROUND OF THE INVENTION

A first solution consists in equipping the first aircraft, called the lead aircraft, with a radio transmitter broadcasting a directional beam and in equipping the wing aircraft with receivers able to receive the transmission from the lead aircraft. The wing aircraft lock(s) themselves (itself) at the maximum transmitted by the lead aircraft. This solution is implemented above all in military aircraft formations. The transmitter and receiver system is well known by the name TACAN, for "TACtical Air Navigation". This solution has the drawback of only providing the wing aircraft with the direction of the lead aircraft.

Another solution consists in equipping the lead aircraft with a transmitter freely broadcasting its position and in equipping the wing aircraft with receivers able to receive the transmission from the lead aircraft. The wing aircraft analyzes the sequence of positions of the lead aircraft in real time and deduces from this the trajectory to be followed and the speed in order to maintain the specified interval. A transmitter system freely transmitting the position of an aircraft is well known by the name ADSB, for "Automatic Dependent Surveillance Broadcast".

These two solutions are purely corrective and lead to instabilities in the interval separating two aircraft. The result is what is referred to as traffic "accordion". Consequently the specified interval may not fall below a certain value without leading to collision risks between aircraft.

SUMMARY OF THE INVENTION

The invention aims to solve this problem by proposing a solution based on a principle that is not solely corrective but also predictive, hence allowing the instabilities in the intervals separating the aircraft to be limited. By implementing the invention, it is possible to reduce the specified interval, and therefore to increase air traffic, notably in the approach phase. To this date, the specified interval between two aircraft may not fall below 90 s. By implementing the invention the minimum interval can be reduced to 60 s or even less.

To this end, the subject of the invention is a method for controlling the formation flight of at least two aircraft, the first aircraft including means of transmitting its position, its velocity and its flight plan, the flight plan comprising predictions of altitude, velocity and time for at least one next waypoint (WPT), the second aircraft including means of receiving the information transmitted by the first aircraft, characterized in that the second aircraft determines its future flight plan as a function of the information received from the first aircraft in order to maintain a constant separation from the first aircraft.

As a matter of course, the information received by the second aircraft includes the position, the velocity and the flight plan of the first aircraft.

The position and the velocity of the first aircraft are pieces of information relating to the moment when the information was transmitted. If the second aircraft only uses these momentary pieces of information to determine its flight plan, there is a risk of an accordion formation. In fact it is possible that the velocity of the first aircraft is led to change in the future and that this change is then not taken into account. According to the invention, in order to determine the flight plan of the second aircraft, account is taken not only of the momentary information but also of predictions of the flight plan of the first aircraft, which allows the accordion effect in the interval separating the two aircraft to be limited.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE PREFERRED EMBODIMENT

Figure 1:
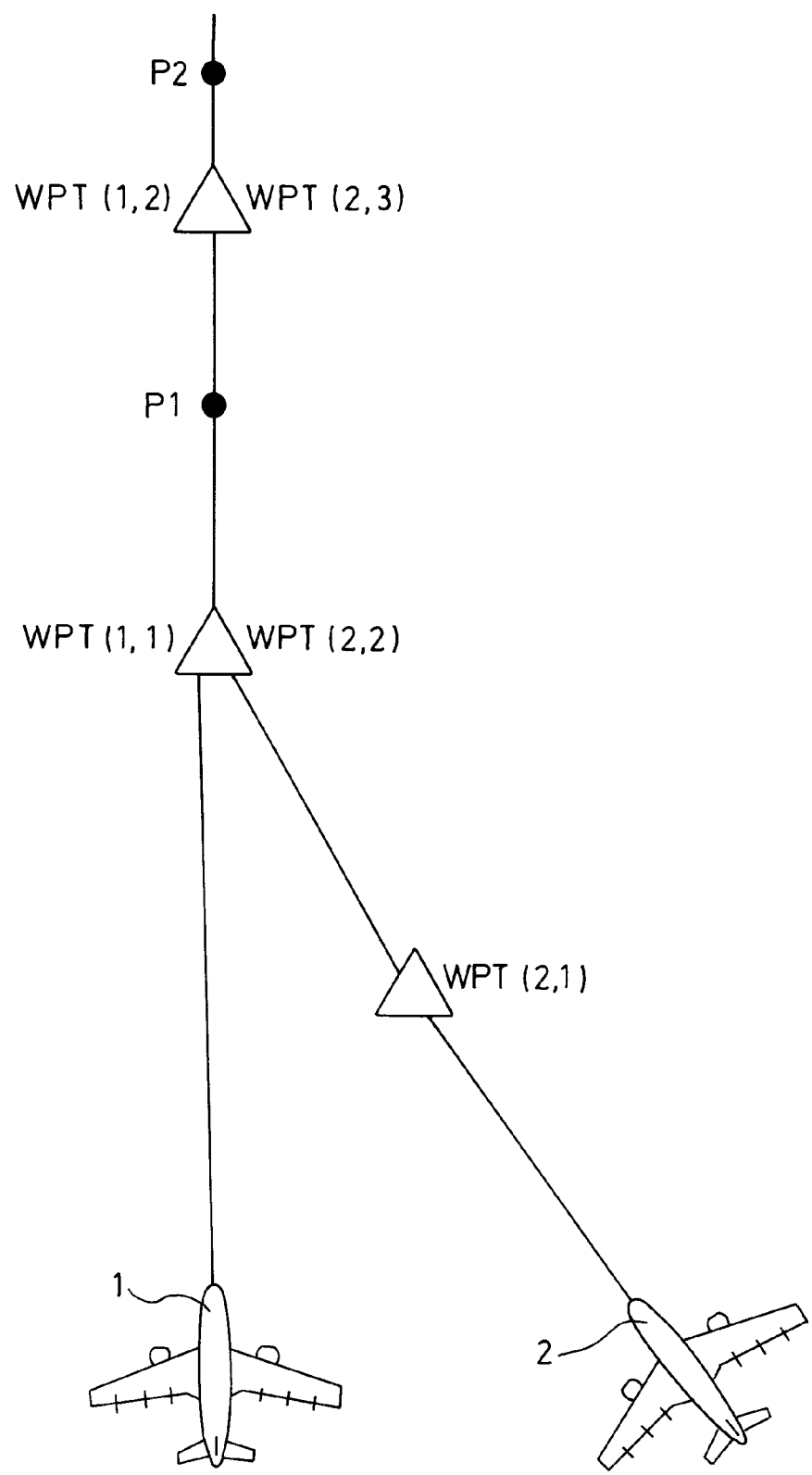
FIG. 1 shows an example of a flight plan followed by two aircraft intended to fly in formation.

FIG. 1 shows two aircraft 1 and 2 intended to fly in formation. The aircraft 1 is intended to be the lead. In the formation, the aircraft 1 is followed by the aircraft 2. It is obvious that the invention is not limited to two aircraft intended to fly in formation. The example presented here may be generalized no matter what the number of aircraft. An aircraft in row n in a formation would be lead aircraft for an aircraft in row n+1 in the same formation.

The lead aircraft 1 transmits its position and its velocity to the aircraft 2. Position is understood to mean the coordinates in three dimensions expressed, for example, in longitude, latitude and altitude along with the associated time. The velocity is expressed, for example, as lateral velocity, the speed and direction of which are provided, and as vertical velocity, only the speed of which is provided.

The aircraft 1 also transmits its flight plan, for which at least one next waypoint (WPT) is provided. For each waypoint the coordinates of the waypoint are given in longitude and latitude, along with predictions regarding the altitude, the velocity and the time of passing the waypoint in question.

The means of transmitting information from the aircraft 1 may use the ADSB system both for the position and the velocity and for the flight plan. The International Civil Aviation Organisation has codified the framework of the ADSB system defined in the DO212 standard.

In addition, the flight plan may also contain intentions of the aircraft beyond these waypoints. This concerns lateral and vertical changes anticipated between the waypoints. In relation to these intentions, the aircraft 1 transmits the geographical coordinates where these changes start and end, the changes in velocity, in altitude or in course anticipated during these changes along with the start and finish times of the change.

FIG. 1 shows for aircraft 1 two waypoints WPT(1,1) and WPT(1,2) and a change occurring between the points P1 and P2. The aircraft 1 begins a change in speed at the point P1 and concludes this change at the point P2. Furthermore, for the aircraft 2 FIG. 1 shows three waypoints WPT(2,1), WPT(2,2) and WPT(2,3). The trajectories of the two planes 1 and 2 become common at the waypoint WPT(1,1), the geographical coordinates of which are identical to those of the waypoint WPT(2,2). Similarly, the geographical coordinates of the waypoints WPT(1,2) and WPT(2,3) are identical.

Assuming a time separation is required, the first point common to the trajectories of the two aircraft 1 and 2 is sought on board the aircraft 2 (wing aircraft). In the present case, determination of this point is immediate due to the coincidence of the waypoints WPT(1,1) and WPT(2,2). If, for example, the waypoint WPT(1,1) does not exist in the flight plan of the aircraft 1, it is possible to determine the common point by interpolating between two other points of the flight plan of the aircraft 1.

Next, knowing the time the aircraft 1 will pass the waypoint WPT(1,1), the aircraft 2 generates a constraint of time to the waypoint WPT(2,2). This time constraint is equal to the anticipated time of the aircraft 1 passing the waypoint WPT (1,1), to which the required separation is added. A flight computer of the aircraft 1, well known by the name FMS for "Flight Management System" will then adjust the velocity of the aircraft 2 by means of a conventional algorithm well known by the name RTA for "Required Time of Arrival" in order to arrive at the waypoint WPT(2,2) at the time of the time constraint generated.

For the following waypoints WPT(2,3) the same procedure is followed by generating a time constraint equal to time the aircraft 1 will pass the waypoint WPT(1,2), to which the required separation is added. Then the velocity of the aircraft 2 is redetermined in order to arrive at the waypoint WPT(2,3) at the time of the time constraint generated.

Advantageously, when the aircraft 1 anticipates a change, a change in the velocity of the aircraft 2 is provided for in order to maintain the constant separation. More precisely, the existence of changes in the flight plan transmitted by the aircraft 1 are sought. In a first case, it is assumed that a change occurs completely, i.e. begins and ends, between two waypoints. It is assumed that the velocity of the aircraft 1 is modified linearly during this change. The distance separating the two aircraft must be equal to D1=V1/T before the start t1 of the change and must be equal to D2=V2/T after the end t2 of the change. V1 and V2 represent the velocities of the aircraft 1 at the beginning and the end of the change respectively. T represents the required separation. t1 represents the time the change starts and t2 represents the time the change finishes. A linear distance variation model D(t) is chosen as a function of the time t between t1 and t2:

$$D(t)=D1+(D2-D1)\times(t-t1)/(t2-t1)$$

The velocity V of the aircraft 2 is varied between t1 and t2 such that:

$$V(t)=D(t)/T$$

As the times t1 and t2, and the velocities V1 and V2 are known from the aircraft 2 before the time t1, this allows the change of the aircraft 2 to be anticipated in order to comply with the separation T between the two aircraft 1 and 2.

In the case where, as shown in FIG. 1, there is a waypoint WPT(1,2) between the points P1 and P2, it is possible to omit the time constraint at the waypoint WPT(2,3).

The flight plan for the aircraft 2 determined in this way may be transmitted to another aircraft which is supposed to follow the aircraft 2 in the formation.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for controlling the formation flight of at least two aircraft, the first aircraft including means of transmitting its position, its velocity and its flight plan, the flight plan comprising predictions of altitude, velocity and time for at least one next waypoint, the second aircraft including means of receiving the information transmitted by the first aircraft, wherein the second aircraft determines its future flight plan as a function of the information received from the first aircraft in order to maintain a constant separation from the first aircraft at the at least one next waypoint.

2. The method as claimed in claim 1, wherein the separation consists in a time separating the two aircraft.

3. The method as claimed in claim 1, wherein the separation consists in a distance separating the two aircraft.

4. The method as claimed in claim 2, wherein the following operations are carried out in sequence:
   the first point common to the flight plans of the two aircraft is sought;
   for the second aircraft a constraint of time to the common waypoint is generated when its passing of this point is equal to the anticipated time of the first aircraft passing the common waypoint, to which the required separation is added;
   the velocity of the second aircraft is determined in order to arrive at the common point at the time of the time constraint generated.

5. The method as claimed in claim 4, wherein for the subsequent common waypoints a constraint of time is generated equal to the time of the first aircraft passing the waypoint in question, to which the required separation is added, and in that the velocity of the second aircraft is predetermined in order to arrive at the waypoint considered at the time of the time constraint generated.

6. The method as claimed in claim 4, wherein when the first aircraft anticipates a change between two waypoints, a modification in the velocity of the second aircraft is provided in order to maintain the constant separation.

7. The method as claimed in claim 1, wherein the transmission means of the first aircraft uses the ADSB system.

8. The method as claimed in claim 5, wherein when the first aircraft anticipates a change between two waypoints, a modification in the velocity of the second aircraft is provided in order to maintain the constant separation.

* * * * *